US012599842B2

(12) United States Patent
Keller et al.

(10) Patent No.: US 12,599,842 B2
(45) Date of Patent: Apr. 14, 2026

(54) ANONYMIZING USER LOCATION DATA IN A LOCATION-BASED APPLICATION

(71) Applicant: Niantic, Inc., San Francisco, CA (US)

(72) Inventors: Robert Keller, Los Altos, CA (US); Edward Wu, Kirkland, WA (US); Jason Chi Shun Sze, Bellevue, WA (US); Dennis Kuo-Juan Chan, San Francisco, CA (US); Eric Koo, Mountain View, CA (US); Katherine Elizabeth LaHorgue, Oakland, CA (US)

(73) Assignee: Niantic, Inc., San Francisco, CA (US)

( * ) Notice: Subject to any disclaimer, the term of this patent is extended or adjusted under 35 U.S.C. 154(b) by 294 days.

(21) Appl. No.: 18/115,461

(22) Filed: Feb. 28, 2023

(65) Prior Publication Data

US 2023/0271088 A1 Aug. 31, 2023

Related U.S. Application Data

(60) Provisional application No. 63/315,055, filed on Feb. 28, 2022.

(51) Int. Cl.
| | |
|---|---|
| *G06F 16/21* | (2019.01) |
| *A63F 13/216* | (2014.01) |
| *A63F 13/79* | (2014.01) |

(52) U.S. Cl.
CPC ............ *A63F 13/79* (2014.09); *A63F 13/216* (2014.09); *G06F 16/219* (2019.01)

(58) Field of Classification Search
CPC .............................. A63F 13/216; G06F 16/219
See application file for complete search history.

(56) References Cited

U.S. PATENT DOCUMENTS

| | | | | |
|---|---|---|---|---|
| 8,918,398 B2 * | 12/2014 | Petersen | ............... | H04W 4/021 |
| | | | | 707/737 |
| 9,128,789 B1 * | 9/2015 | Zorzella | .................. | H04L 67/01 |
| 10,268,775 B2 | 4/2019 | Aad | | |
| 11,790,470 B1 * | 10/2023 | Wolter | .................. | G06F 40/174 |
| | | | | 726/30 |

(Continued)

FOREIGN PATENT DOCUMENTS

| | | |
|---|---|---|
| CN | 101026869 A | 8/2007 |
| JP | 2015-007885 A | 1/2015 |
| KR | 100961461 B1 | 6/2010 |

OTHER PUBLICATIONS

Pramod Maurya, Medium, "Lesser known things about Google's S2" https://medium.com/@self.maurya/lesser-known-things-about-googles-s2-fea42f852f67 (Year: 2018).*

(Continued)

*Primary Examiner* — Allen S Lin
(74) *Attorney, Agent, or Firm* — Fenwick & West LLP

(57) ABSTRACT

A location-based application, such as a parallel reality game, may receive, from a client device of a user of the application, location data representing the user's position in the real-world. In one embodiment, a game platform associated with the application writes location data derived from the received location data to each of a plurality of retention tables, each storing the location data at a different level of granularity and for a different retention period. Upon expiration of a retention period for a first retention table, the game platform anonymizes the location data and transfers the anonymized data to a second retention table storing the data at a lower level of granularity. The game platform repeats this process until expiration of the retention period for the table having the lowest level of granularity before deleting the location data from storage.

13 Claims, 7 Drawing Sheets

500

(56) References Cited

U.S. PATENT DOCUMENTS

| | | | | |
|---|---|---|---|---|
| 2002/0049760 A1* | 4/2002 | Scott | ..................... | H04L 67/104 |
| 2012/0233129 A1 | 9/2012 | Brinkmoeller et al. | | |
| 2013/0238745 A1 | 9/2013 | Ramachandran et al. | | |
| 2015/0278545 A1 | 10/2015 | Bigras | | |
| 2016/0132886 A1* | 5/2016 | Burke | ................ | G06Q 20/3827 |
| | | | | 705/44 |
| 2019/0199690 A1* | 6/2019 | Klein | .................... | H04L 63/162 |
| 2020/0210436 A1* | 7/2020 | Mishra | .............. | G06F 16/24575 |
| 2020/0233977 A1* | 7/2020 | Chickerur | ........... | G06F 21/6254 |
| 2021/0081260 A1* | 3/2021 | Gilling | .................... | G06F 9/541 |

OTHER PUBLICATIONS

International Journal of Geographical Information Science, May 26, 2015, âGeographic Partitioning Techniques for the Anonymization of Health Care Dataâ https://arxiv.org/pdf/1505.06786 (Year: 2015).*

PCT International Search Report and Written Opinion, PCT Application No. PCT/IB2023/051872, May 30, 2023, 9 pages.
Demir, L. et al., "The Pitfalls of Hashing for Privacy", IEEE Communications Surveys & Tutorials, vol. 20, Issue. 1, Aug. 31, 2017, pp. 551-565.
European Patent Office, Extended European Search Report and Opinion, European Patent Application No. 23759447.8, Oct. 2, 2025, 14 pages.
Gruteser, M. et al., "Anonymous Usage of Location-Based Services Through Spatial and Temporal Cloaking", Proceedings of MobiSys 2003: The First International Conference on Mobile Systems, Applications, and Services, May 5, 2003, pp. 31-42.
Iftikhar, N. et al., "Using a Time Granularity Table for Gradual Granular Data Aggregation", Sep. 20, 2010 (Sep. 20, 2010), Advances in Databases and Information Systems, Lecture Notes in Computer Science, vol. 6295, Springer, Berlin, Heidelberg, Sep. 20, 2010, pp. 219-233.

* cited by examiner

100

600

| Player ID | S2 Cell Level | Cell Number | Data Capture Date |
|---|---|---|---|
| Player 1 | 30 | 12345678998765432112 | 9/26/2021, 11:15:32 AM PST |
| Player 2 | 30 | 91245692857360291923 | 9/26/2021, 12:27:05 PM PST |
| Player 3 | 30 | 29583014760291029532 | 9/27/2021, 1:02:20 PM PST |
| Player 4 | 30 | 73205681048681012847 | 9/29/2021, 1:21:02 PM PST |
| Player 5 | 30 | 52940569381294011945 | 9/30/2021, 9:21:49 AM PST |
| Player 6 | 30 | 29104856960301782947 | 9/30/2021: 12:14:58 PM PST |

| Player ID | S2 Cell Level | Cell Number | Data Capture Date |
|---|---|---|---|
| Player 1 | 14 | 19285019475927572189 | 9/26/2021, 11:15:32 AM PST |
| Player 2 | 14 | 27121210102385720131 | 9/26/2021, 12:27:05 PM PST |
| Player 3 | 14 | 10226012683018208295 | 9/27/2021, 1:02:20 PM PST |
| Player 4 | 14 | 89327509285719203860 | 9/29/2021, 1:21:02 PM PST |
| Player 5 | 14 | 10293857291038275068 | 9/30/2021, 9:21:49 AM PST |
| Player 6 | 14 | 49502017204896783223 | 9/30/2021: 12:14:58 PM PST |

| Player ID | S2 Cell Level | Cell Number | Data Capture Date |
|---|---|---|---|
| Player 1 | 10 | 30587031820458850281 | 9/26/2021, 11:15:32 AM PST |
| Player 2 | 10 | 29378603817829485672 | 9/26/2021, 12:27:05 PM PST |
| Player 3 | 10 | 91827450927859860937 | 9/27/2021, 1:02:20 PM PST |
| Player 4 | 10 | 81289572937506028175 | 9/29/2021, 1:21:02 PM PST |
| Player 5 | 10 | 93471940560281728502 | 9/30/2021, 9:21:49 AM PST |
| Player 6 | 10 | 83327060391719459271 | 9/30/2021: 12:14:58 PM PST |

ANONYMIZING USER LOCATION DATA IN A LOCATION-BASED APPLICATION

CROSS-REFERENCE TO RELATED APPLICATION

The application claims the benefit of U.S. Provisional Application No. 63/315,055, filed Feb. 28, 2022, which is incorporated by reference.

TECHNICAL FIELD

The subject matter described relates generally to location-based applications, and in particular to a system and method for storing geospatial location data for a user at varying levels of granularity and for varying retention periods and for providing downstream services to groups of users without the initiating upstream service knowing the identifies of the individual users.

BACKGROUND

Location-based games and other applications use the real world as their geography. Parallel reality games are a type of location-based game that use a virtual world that parallels the real-world geography. The parallel virtual world may span the entire real world, and players from all of the world may interact and perform various game objectives in the parallel virtual world by navigating and performing actions in the real world. Many client devices used by players in the parallel reality game include positioning devices that track player location data as players move through the real world while playing the parallel reality game and interacting with virtual elements in the game. This data may be stored on a central game platform and used to perform location data analysis. However, prolonged storage of player location data may implicate privacy concerns. Moreover, the usefulness of player location data for analysis purposes may degrade over time such that continued storage causes stale data to clog game databases.

SUMMARY

In a location-based parallel reality game, or other location-based application, users (also referred to as "players") navigate through the real-world with a location-aware client device, such as a smartphone. As players navigate the virtual world, they may interact with virtual elements and participate in virtual experiences that may be strategically located within the virtual world. The player's client device may send location data to a server hosting the parallel reality game or application for storage and use in data analysis. The present disclosure describes approaches anonymizing received location data by storing the location data in each of a plurality of retention tables and periodically reducing the level of granularity of the stored data before ultimately removing the data from storage.

In one embodiment, upon receiving player location data from a client device, a game platform writes location information derived from the location data to each of a plurality of retention tables in a game database, each retention table having a different level of granularity and retention period. For example, a first, fine-grained retention table storing data at a highest level of granularity (e.g., a player's precise longitude and latitude) may have a shortest retention period, while a second, coarser-grained retention table with a lower level of data granularity (e.g., the city block on which the player is located) may retain the data for a longer period. As a result, the same item of location data initially provided by the client device may be anonymized and stored differently in each of the tables. Upon expiration of a retention period for a table, the game platform may abstract or anonymize the location data further for transfer to a different retention table. For instance, in the example noted above, the player's longitude and latitude may be abstracted to the city-block level for transfer to the second table, while the data originally stored in the second table may be further abstracted (e.g., to the city in which the player is located) for transfer to a third, still coarser-grained retention table having a longest retention period. Upon expiration of the retention period for the third retention table, the game platform may cause the location data to be deleted from storage in the game database.

Storage of the location data at varying levels of granularity enables servers of the game platform to perform different types of location-based analysis and provide various services, while periodic anonymization and deletion of the data provide increased efficiency over existing systems by storing less data and help to protect player privacy. For example, in one embodiment, players may be segmented based on various characteristics (e.g., location data in a specified time period) for purposes of A/B testing or "make-good" services. A first service, e.g., on a first server of the game platform, uses location data or other characteristics to identify a list of hashed player IDs, such as a list of players located in a specific city or players who visited a specified point of interest in the game. The first service sends the list of hashed player IDs and an identification of a second service to a mapping module via a one-way application programming interface (API) call. The mapping module queries a lookup table to identify raw player IDs associated with the received hashes and sends the player ID data to the identified second service, which may be a downstream service on a separate server of the game platform. For example, where the second service is a "make good" service, the identified players may receive an additional game object as compensation for a prior error in the game. By limiting exposure of the hashed player IDs to the upstream service and raw player IDs to the downstream service, the game platform protects player privacy and decreases the likelihood of accidental disclosure of personally identifiable information.

BRIEF DESCRIPTION OF THE DRAWINGS

FIGS. 6A-6C illustrate short-term, medium-term, and long-term retention tables storing player location data, according to one embodiment.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using this disclosure, will understand that the subject matter described is applicable in other situations where device location data is collected and stored. For example, a restaurant guide application may want to identify users that have recently been in the vicinity of a new restaurant and recommend it to a subset of those users (e.g., those with a preference for the restaurant's particular cuisine).

Figure 1:
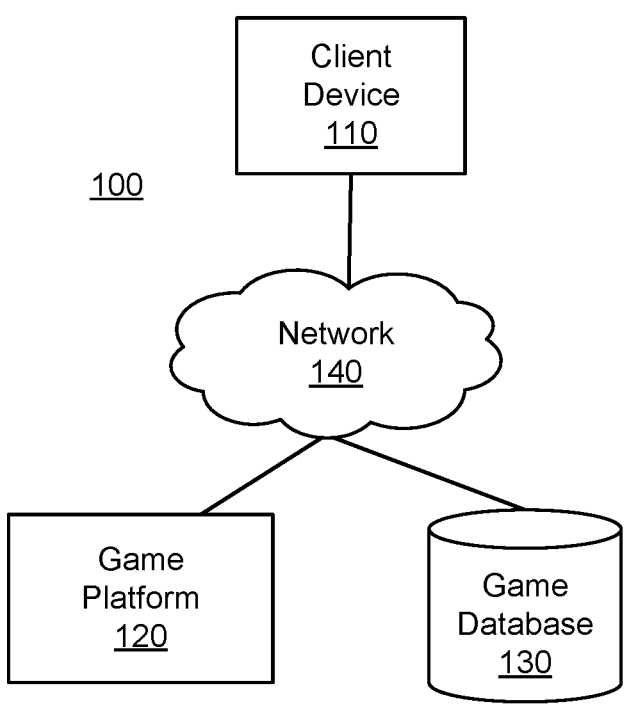
FIG. 1 is a block diagram of a networked computing environment suitable for hosting a parallel reality game, according to one embodiment.

FIG. 1 is a block diagram of a networked computing environment 100 suitable for hosting a parallel reality game, according to one embodiment. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. For example, a coordinate system in the real world (e.g., longitude and latitude) may be mapped to a coordinate system in the virtual world (e.g., x/y coordinates, virtual longitude and latitude, etc.).

Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The virtual world may be divided up into regions (e.g., cells) corresponding to contiguous geographic regions of the real world. In various embodiments, the portions of the virtual world are defined according to a geographic indexing framework. For instance, the portions of the virtual world may be defined according to the S2 library, which defines a hierarchy of cells dividing the globe, a three-dimensional object, into sets of two-dimensional cells at different levels of granularity. In other embodiments, different geographic indexing frameworks may be used.

Figure 5:
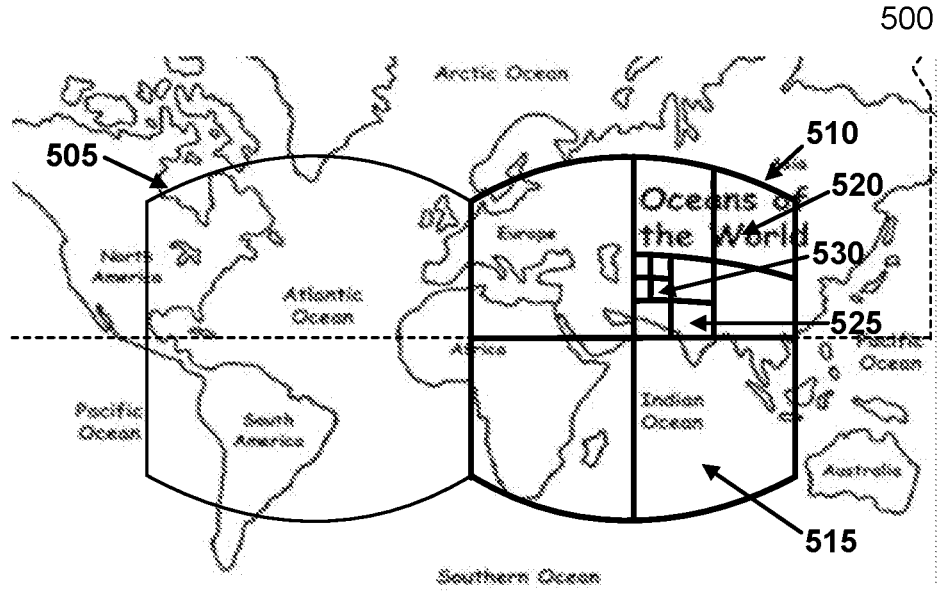
FIG. 5 illustrates an example unit sphere subdivided using a S2 hierarchy, according to one embodiment.

For example, FIG. 5 illustrates a portion of a geographic map 500 that has been divided using the S2 library framework in which the unit sphere is divided into a hierarchy of cells. To obtain the top level of the hierarchy, the six faces of a cube are projected onto the unit sphere, and the lower levels are obtained by subdividing each cell into four children recursively. In the embodiment shown in FIG. 5, the unit sphere represented by the map 400 includes two of the six face cells 505 and 510, of which the face cell 510 has been subdivided four times. Each cell in the hierarchy has a level, which is defined as the number of times the cell has been subdivided. For example, the face cell 510 has a cell level of 0, while the cell 515 has a level of 1, the cell 520 has a level of 2, the cell 525 has a level of 3, and the cell 530 has a level of 4. As discussed herein, the S2 hierarchy may be used for spatial indexing and approximating points as individually cells and regions as collections of cells. Each cell level may contain a collection of cell numbers that identify a particular cell and can be mapped to one or more labels indicating the location, such as latitude/longitude, neighborhood, city, country, etc.

Returning now to FIG. 1, the regions of the virtual world can be used to index various geolocated data, such as player location data, for storage in the game database 130. For example, as described below, the game database 130 may include a plurality of retention tables that store player location data at varying levels of granularity (e.g., at differing S2 cell levels) and for varying retention periods. In one embodiment, player location data is periodically aggregated and transferred to a different retention table having a coarser-grained data storage component than the previous retention table. The data transfer process may be iterative such that player location data is transferred to tables of decreasing granularity before being deleted from storage. Each retention table may have a different retention period. For example, in one embodiment, fine-grained location data (e.g., the player's longitude/latitude, measured at an S2 cell level of 30) may be stored in a short-term retention table while coarser-grained location data (e.g., the city block on which the player is located, measured at an S2 cell level of 14) may be stored in a medium-term table, and still coarser-grained location data (e.g., the city in which the player is located, measured at an S2 cell level of 10) may be stored in a long-term retention table.

The networked computing environment 100 uses a client-server architecture, where a game platform 120 communicates with a client device 110 over a network 140 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game platform 120 over the network 140.

A client device 110 can be any portable computing device that can be used by a player to interface with the game platform 120. For instance, a client device 110 can be a wireless device, a personal digital assistant (PDA), portable gaming device, cellular phone, smart phone, tablet, navigation system, handheld GPS system, wearable computing device (e.g., a headset), a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game platform 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet. Various embodiments of the client device 110 are described in greater detail below, with reference to FIG. 2.

The game platform 120 can be any computing device and can include one or more processors and one or more computer-readable storage media. The computer-readable storage media can store instructions which cause the processor to perform operations. In various embodiments, the game platform 120 maintains a copy of a master game state and manages interactions between client devices 110 of players such that all of the players interact with a consistent game world. The game platform 120 may include services provided by different servers. For example, as discussed below with respect to FIG. 4, a calling service located on a first server may send a list of hashed player IDs (e.g., of users located in a specified area or having one or more other shared characteristics) to a mapping module on a separate server of the game platform. The mapping module queries a lookup table to identify raw player ID data associated with each of the hashed player IDs and sends the raw player ID data to a destination service on still another server of the game platform 120. The division of services between different servers ensures the calling service does not know the identities of players, and the destination service does not know the hashed player IDs.

In various embodiments, the game platform 120 determines regions for the parallel reality game based on a snapshot of real-world data, including device position information indicating player locations in the real world. The game platform 120 divides the geographic area of the virtual world into cells (e.g., S-2 cells) covering portions of the geographic area. In some embodiments, the geographic area of the virtual world may correspond to the entire real world. In other embodiments, the geographic area corresponds to a smaller portion (e.g., a region) of the real world.

The game platform 120 can be configured to receive requests for game data from a client device 110 (for instance via remote procedure calls (RPCs)) and to respond to those requests via the network 140. For instance, the game platform 120 can encode game data in one or more data files and provide the data files to the client device 110. In addition, the game platform 120 can be configured to receive game data (e.g., player positions, player actions, player input, etc.) from a client device 110 via the network 140. For instance, the client device 110 can be configured to periodically send player input and other updates to the game platform 120, which the game platform 120 uses to update game data in the game database 130 to reflect any and all changed conditions for the game. Various embodiments of the game platform 120 are described in greater detail below, with reference to FIG. 3.

The game platform 120 can include or can be in communication with a game database 130. The game database 130 stores game data used in the parallel reality game to be served or provided to the client device(s) 110 over the network 140. The game data stored in the game database 130 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current and historic player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 130 can be populated either offline or in real time by system administrators or by data received from users/players of the game, such as from a client device 110 over the network 140. In one embodiment, the game database 130 stores current and historic player position data in a plurality of retention tables having varying levels of granularity and retention periods, as discussed in greater detail below, with reference to FIGS. 3 and 6A-6C.

The network 140 can be any type of communications network, such as a local area network (e.g. intranet), wide area network (e.g. Internet), or some combination thereof. The network can also include a direct connection between a client device 110 and the game platform 120. In general, communication between the game platform 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. Furthermore, the networked computing environment 100 may contain different or additional elements and functionality may be distributed between the client device 110, server 120, database 130, and feature matching system 140 in a different manner than described.

In situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 2:
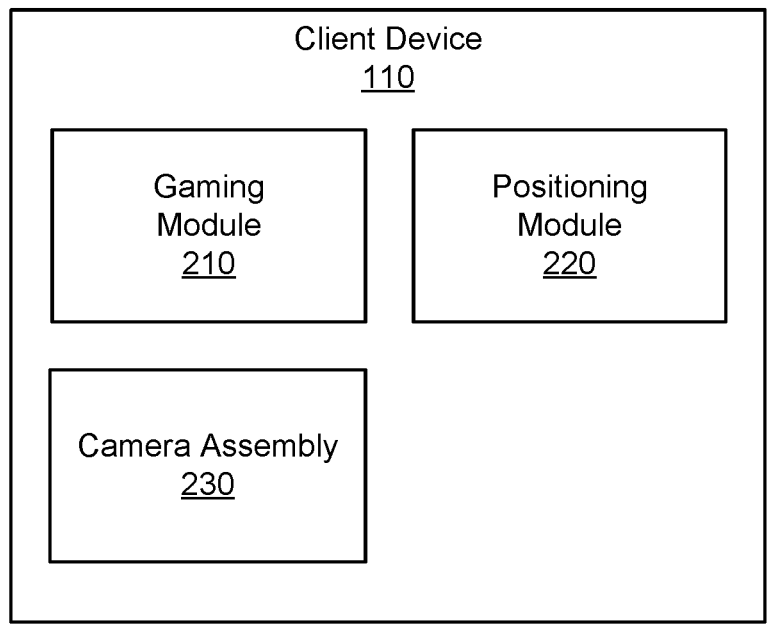
FIG. 2 is a block diagram of the client device of FIG. 1, according to one embodiment.

FIG. 2 is a block diagram of the client device 110 of FIG. 1, according to one embodiment. In the embodiment shown, the client device 110 includes a gaming module 210, a positioning module 220, a camera assembly 230, and an image matching module 240. In other embodiments, a client device 110 may include different or additional elements. Furthermore, the functionality may be distributed among the elements in different way than described.

The gaming module 210 provides a player with an interface to participate in the parallel reality game. The game platform 120 transmits game data over the network 140 to the client device 110 for use by the gaming module 210 to provide local versions of the game to players at locations remote from the game platform 120. In one embodiment, the gaming module 210 presents a user interface on a display device associated with the client device 110 that displays a virtual world (e.g., renders imagery of the virtual world) associated with the game and allows a user to interact in the virtual world to perform various game objectives. In some embodiments, the gaming module 210 presents image data from the real world (e.g., captured by the camera assembly 230) augmented with virtual elements from the parallel reality game. In these embodiments, the gaming module 210 may generate virtual content or adjust virtual content according to other information received from other components of the client device 110. For example, the gaming module 210 may adjust a virtual object to be displayed on the user interface according to a depth map of the scene captured in the image data (e.g., as generated by a depth estimation model).

The gaming module 210 can also control various other outputs to allow a player to interact with the game without requiring the player to view a display screen. For instance, the gaming module 210 can control various audio, vibratory, or other notifications that allow the player to play the game without looking at the display screen. The gaming module 210 can access game data received from the game platform 120 to provide an accurate representation of the game to the user. The gaming module 210 can receive and process player input and provide updates to the game platform 120 over the network 140.

The positioning module 220 can be any device or circuitry for monitoring the position of the client device 110. For example, the positioning module 220 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 220 may further include various other sensors that may aid in accurately positioning the client device 110 location.

As the player moves around with the client device 110 in the real world, the positioning module 220 tracks the position of the player and provides the player position information to the gaming module 210. The gaming module 210 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world.

The gaming module 210 can provide player position information to the game platform 120 over the network 140. In response, the game platform 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g., to update player position in the virtual world).

In addition, any location information associated with players will be stored and maintained in a manner to protect player privacy. For example, as discussed in greater detail below, with reference to FIGS. 3 and 6A-6C, fine-grained location data may be stored in a retention table for only a short duration before being transferred to a retention table in which the data is represented at a lower level of granularity. Accordingly, a player's latitude/longitude (e.g., the latitude/longitude of the client device 110) may be stored for a short period of time before the data is transferred to a retention table where it is represented by the city block or the city in which the player is located. Player location data may be periodically aggregated and reduced in granularity over time before being deleted from the game database 130.

The camera assembly 230 includes one or more cameras configured to capture images of the physical environment in which the client device 110 is located. The portion of the physical environment depicted in an image is referred to as a scene. The camera assembly 230 captures image data corresponding to the scene and stores it in a storage medium of the client device. Additionally or alternatively, the image data may be sent to the game platform 120 via the network 140. The camera assembly 230 may utilize a variety of varying photo sensors with varying color capture ranges at varying capture rates. The camera assembly 230 may contain a wide-angle lens or a telephoto lens. The camera assembly 230 may be configured to capture single images or video as the image data. The client device 110 may also include other sensors for recording data about the client device's physical environment, such as accelerometers, gyroscopes, inertial measurement units (IMUs), barometers, thermometers, light sensors, microphones, etc. The image data can be appended with metadata describing other details of the image data including sensory data (e.g. temperature, brightness of environment) or capture data (e.g. exposure, warmth, shutter speed, focal length, capture time, etc.).

Figure 3:
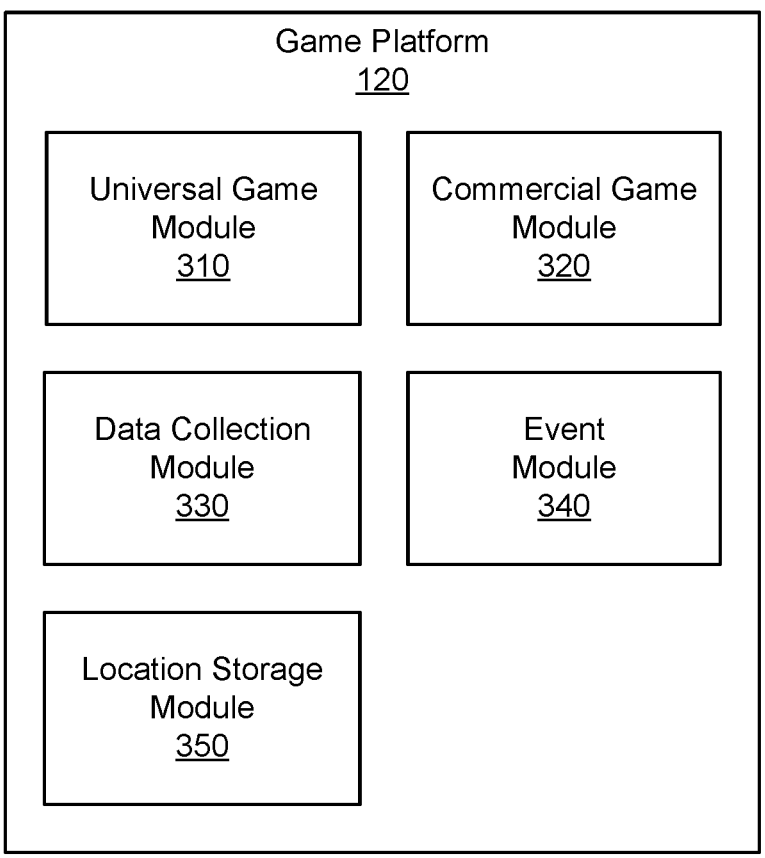
FIG. 3 is a block diagram of the game platform of FIG. 1, according to one embodiment.

FIG. 3 is a block diagram of the game platform 120 of FIG. 1, according to one embodiment. In the embodiment shown, the game platform 120 includes a universal gaming module 310, a commercial game module 320, a data collection module 330, and an event module 340. As mentioned above, the game platform 120 interacts with a game database 130 that may be part of the game platform 120 or accessed remotely (e.g., the game database 130 may be a distributed database accessed via the network 140). In other embodiments, the game platform 120 contains different or additional elements. In addition, the functions may be distributed among the elements in a different manner than described. For instance, the game database 130 can be integrated into the game platform 120.

The universal game module 310 hosts the parallel reality game for players and acts as the authoritative source for the current status of the parallel reality game for all players. As the host, the universal game module 310 generates game content for presentation to players, e.g., via their respective client devices 110. The universal game module 310 may access the game database 130 to retrieve or store game data when hosting the parallel reality game. The universal game module 310 also receives game data from client device 110 (e.g. depth information, player input, player position, player actions, landmark information, etc.) and incorporates the game data received into the overall parallel reality game for all players of the parallel reality game. The universal game module 310 can also manage the delivery of game data to the client device 110 over the network 140. The universal game module 310 may also govern security aspects of client device 110 including but not limited to securing connections between the client device 110 and the game platform 120, establishing connections between various client device 110, and verifying the location of the various client device 110.

The commercial game module 320, in embodiments where one is included, can be separate from or a part of the universal game module 310. The commercial game module 320 can manage the inclusion of various game features within the parallel reality game that are linked with a commercial activity in the real world. For instance, the commercial game module 320 can receive requests from external systems such as sponsors/advertisers, businesses, or other entities over the network 140 (via a network interface) to include game features linked with commercial activity in the parallel reality game. The commercial game module 320 can then arrange for the inclusion of these game features in the parallel reality game.

The data collection module 330, in embodiments where one is included, can be separate from or a part of the universal game module 310. The data collection module 330 can manage the inclusion of various game features within the parallel reality game that are linked with a data collection activity in the real world. For instance, the data collection module 330 can modify game data stored in the game database 130 to include game features linked with data collection activity in the parallel reality game. The data collection module 330 can also analyze and data collected by players (e.g., as part of a crowd-sourcing effort) and provide the data for access by various platforms. To provide a specific example, players may be prompted to submit photographs of landmarks and other features of interest in their environment and the data collection module 330 may incorporate virtual elements corresponding to the real-world landmarks or features into the parallel reality game based on player submissions (e.g., subject to verifying that the landmark exists and is located where the submitting player indicated).

The event module 340 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The location storage module 350 receives player location data (e.g., from the positioning module 220 of the client device 110) and assigns the received data to one or more of a plurality of retention tables for storage in the game database 130. In one embodiment, the location storage module 350 hashes the player ID associated with the received location data before providing the location data for storage in the retention table(s). Each of the retention tables may be associated with a level of granularity at which the player location data is stored such that a single player location may be represented and stored differently in each of the retention tables.

The level of granularity for a table may be represented by a S2 cell level or other geographic indexing level that includes a geographic range in which the device may be positioned. For example, FIGS. 6A, 6B, and 6C each show a retention table storing location data associated with a client device 110, such as a client device 110 associated with a player of a parallel reality game. As shown in FIGS. 6A-6C, location data for the same player is represented differently in each of the tables 600, 610, and 620 based on the S2 cell level associated with the respective table, with the table 600 containing the most granular location data, and the table 620 containing the least granular location data. That is, in the table 600, the location for Player 1 is represented at a first S2 cell level, such that the location data essentially provides a specific latitude and longitude of the player's client device 110. The location data for Player 1 is stored in the table 610 at a second S2 cell level, and might indicate, for example, the city block on which Player 1 is located. Still further, the location data for Player 1 is stored in the table 620 at a third S2 cell level and indicate, for example, the city in which Player 1 is located. In each table, a player's location is represented by a cell number that identifies a particular cell and can be mapped to one or more labels indicating the player's location, such as the latitude/longitude, neighborhood, city, country, etc. While this description and FIGS. 6A-6C describe and depict three retention tables used to store location data in the game database 130, one of skill in the art will appreciate that fewer or additional retention tables may be used. Additionally, while the retention tables are described as using the S2 cell library, one of skill in the art will appreciate that other geographic indexing frameworks may be used.

In one embodiment, a single item of location information derived from the received location data is initially written to a fine-grained location retention table, such as the table 600 of FIG. 6A, and then abstracted to one or more less granular tables as corresponding retention times expire. Alternatively, the location storage module 350 writes location information derived from the location data to each of the retention tables in the game database 130. To do so, the location storage module 350 abstracts the received data from its current level of granularity to a level of granularity associated with each of the retention tables. For example, the precise latitude and longitude at which Player 1 is located may be abstracted to the Player's city block (for storage in the table 610) and to the Player's current city (for storage in the table 620). In this way, player location data is stored at varying levels of granularity in each of the different retention tables of the game database 130. In still other embodiments, received location data is written to two or more retention tables, but fewer than all of the retention tables in the game database 130.

The location storage module 350 may additionally establish and modify a retention period for each of the retention tables in the game database 130. For example, a retention table that stores location data at a highest level of granularity (e.g., the table 600) may have a shortest retention period such that the player's precise location is stored only for a short period of time. As the data in the retention tables becomes increasingly coarse, the data may be stored for longer periods of time. Accordingly, the retention period associated with a table may be inversely proportional to the level of granularity at which the data in the table is stored such that coarse-grained location data is stored for a longer period of time than fine-grained location data. With respect to the retention tables depicted in FIGS. 6A-6C, the table 600 may be designated a "short-term table," the table 610 designated a "medium-term table," and the table 620 designated a "long-term table." In one example, data in the "short-term table" is stored for a specified number of days (e.g., 15-45 days), data in the "medium-term table" is stored for a specified number of months (e.g., 10-20 months), and data in the "long-term table" is stored for a specified number of years (e.g., 5-10 years).

In one embodiment, the location storage module 350 aggregates location data for which the retention period has expired and reduces the granularity of the data for transfer to a different retention table. For example, when the retention period associated with the short-term retention table (e.g., the table 600) has expired, the location storage module 350 transfers the location data to the medium-term retention table (e.g., the table 610). Accordingly, while the player's location may be stored at a fine-grained level for a first period of time (i.e., the retention period associated with the table 600), the location data is abstracted for storage in a less granular table at the end of that first time period. Similarly, at the end of the medium-term table retention period, the location data is further abstracted and transferred to the long-term table 620. When the retention period for the long-term table expires, the location storage module 350 causes the player location data to be deleted from storage in the game database 130. In this way, the specificity with which player location data is stored in the game database 130 decreases over time (i.e., as the time period since the positioning module 220 reported the location data to the game platform 120 increases).

The game platform 120 may use the location data stored at varying levels of granularity in the retention tables to perform different types of location-based analysis. For example, data stored at a city-level may be used to analyze how many players in a particular city participate in the parallel reality game or how and how often players migrate between cities. In still other embodiments, data in the retention tables may be used for data segmentation and ingestion.

Figure 4:
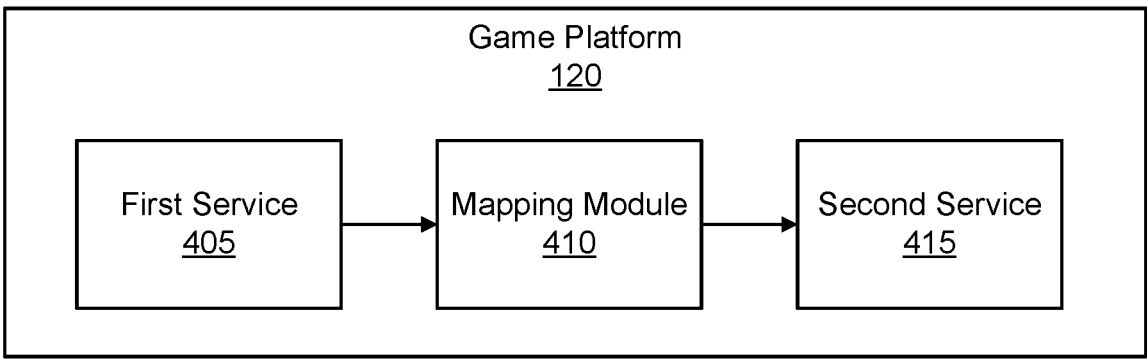
FIG. 4 is a block diagram illustrating additional components of the game platform of FIG. 1, according to one embodiment.

For example, FIG. 4 is a block diagram illustrating additional components of the game platform 120 of FIG. 1, according to one embodiment. In the embodiment shown in FIG. 4, the game platform 120 includes a first service 405, a mapping module 410, and a second service 415. As discussed above, the location storage module 350 of the game platform 120 hashes player IDs associated with received location data before storing the player location data in the retention tables. The mapping module 410 maintains a lookup table (e.g., a rainbow table) that maps the hashed user IDs to raw player IDs and that may be used to identify individual players or groups of players, e.g., that have specified attributes or for whom a specified action should be taken.

In one embodiment, the first service 405 (also referred to as the "upstream service" or "calling service") communicates with the mapping module 410 via a one-way API call to request identification of one or more hashed player IDs. The request includes an identification of a second service (also referred to as the "downstream service" or "destination service") to which the mapping module 410 should send raw player ID data associated with the hashes.

The mapping module 410 maintains an approval list of second services 415 that are authorized to receive raw player ID data. In various embodiments, approval may be based on the purpose for which the player ID data is being shared (e.g., a second service 415 may be authorized to receive ID data for AB testing only) or the associated first service 405 (e.g., a second service 415 may be authorized to receive ID data based on hashes sent by first service 405A, but not from first service 405B). In other embodiments, a second service 415 may be authorized to receive ID data regardless of the associated first service 405.

The mapping module 410 queries the approval list to determine whether the identified second service 415 is authorized to receive raw player ID data associated with the received hashes. If so, the mapping module 410 queries the lookup table to identify the raw player ID information associated with the received hashed user IDs, and sends the raw player IDs to the second service 415 (also referred to as the "downstream service" or "destination service"). The lookup table cannot be accessed by the first service 405, the second service 415, or other components of the game platform 120. Rather, the lookup table receives the hashed ID as input from the first service 405 and outputs the raw player ID to the second service 415. Accordingly, the lookup table is the only location on the game platform 120 where the hashed and raw player IDs are available together, and is inaccessible to the broader game platform 120. Because the first service 405 does not receive the raw player IDs, and the second service 415 does not receive the hashed player IDs the lookup table acts as a "secret keeper" and provides increased privacy and security by ensuring that player data is shared no more than necessary to achieve a specified goal.

For instance, the architecture of FIG. 4 may be used to implement A/B testing or to identify segments of players to receive a game object or virtual reward. In the first example, the first service 405 identifies a group of players having certain characteristics for whom to perform the A/B testing. Example characteristics may include players located in a specified city, players having a specified level or level within a specified range in the parallel-reality game, players who have received specified game items, players who have visited specified geographic areas within a time period, players having a specified last login time, and the like. The retention tables discussed above, such as the tables shown in FIGS. 6A-6C, may be used to identify hashed IDs of players having desired location-based characteristics, while non-location-based player characteristics may be retrieved from other portions of the game database 130. Where the desired characteristics include fine-grained player location data (e.g., to identify players located in a specified level 30 S2 cell), the first service 405 must generate the list of hashed IDs before the expiration of the retention period for the short-term table, while A/B testing on coarser location data may be performed for an extended period of time in view of the longer retention periods for the medium and long-term tables.

After identifying a set of hashed player IDs associated with players having one or more specified characteristics, the first service 405 sends the hashed player IDs to the mapping module 410 for identification. Player IDs may be sent individually or as a group. The mapping module 410 queries the lookup table using the hashed player IDs and sends the corresponding raw player ID data to the second service 415, which implements one or more game changes according to the parameters of the A/B testing. For example, in one embodiment, the second service 415 divides (e.g., randomly) the raw player IDs into two groups, such as an "A" group (i.e., a control group) for whom no change is made, and a "B" group (i.e., a treatment group) for whom the second service 405 implements one or more game changes (e.g., changes to a game rule). The second service 410 collects and analyzes game data for the A and B groups to assess the impact of the one or more game changes, for example, on player performance, duration of game play, player location, and the like.

In the second example, the architecture of FIG. 4 may be used to identify players to receive a game object or virtual reward, for instance, where a group of players who are or were located in a specified geographic region, have interacted with a specified point of interest in the parallel-reality game, or have some other shared characteristic were positively or negatively impacted by an intended or unintended change to the game. For example, the first service 405 may be a "make-good" service that compensates for a prior game error. To identify and compensate affected users, the game platform 120 uses the segmentation method described above. That is, the first service 405 generates a list of hashed IDs of players affected by the error and makes a one-way API call to the mapping module 410. The mapping module 410 queries the lookup table to identify the raw player IDs associated with the received hashes and sends the player IDs to the second service 410, which compensates the identified players (e.g., by awarding the players with an additional game object).

In still another example, the location data stored in the retention tables, and optionally, the one-way lookup table, is used to perform further location-based analysis, such as calculations of real-world social interaction between players of the parallel reality game. For instance, modules of the game platform 120 may use the location data to determine how many players were near each other (e.g., located in the same S2 cell), how many players visited a specified point of interest, how many players interacted with virtual objects and/or each other (e.g., players that interacted with a virtual object in the same level 20 S2 cell in the same minute), and the like. In some embodiments, the game platform 120 does not identify specific players associated with the location data, for example, where the purpose of the analysis is to measure the success of an event (e.g., based on how many players used the location-based application within a specified area in a specified period of time). However, the one-way lookup table may be used where a service of the game platform 120 will take some action with respect to a subset of users, such as sending a message or awarding a virtual item to players located in a specified S2 cell.

Exemplary Parallel-Reality Game

Figure 7:
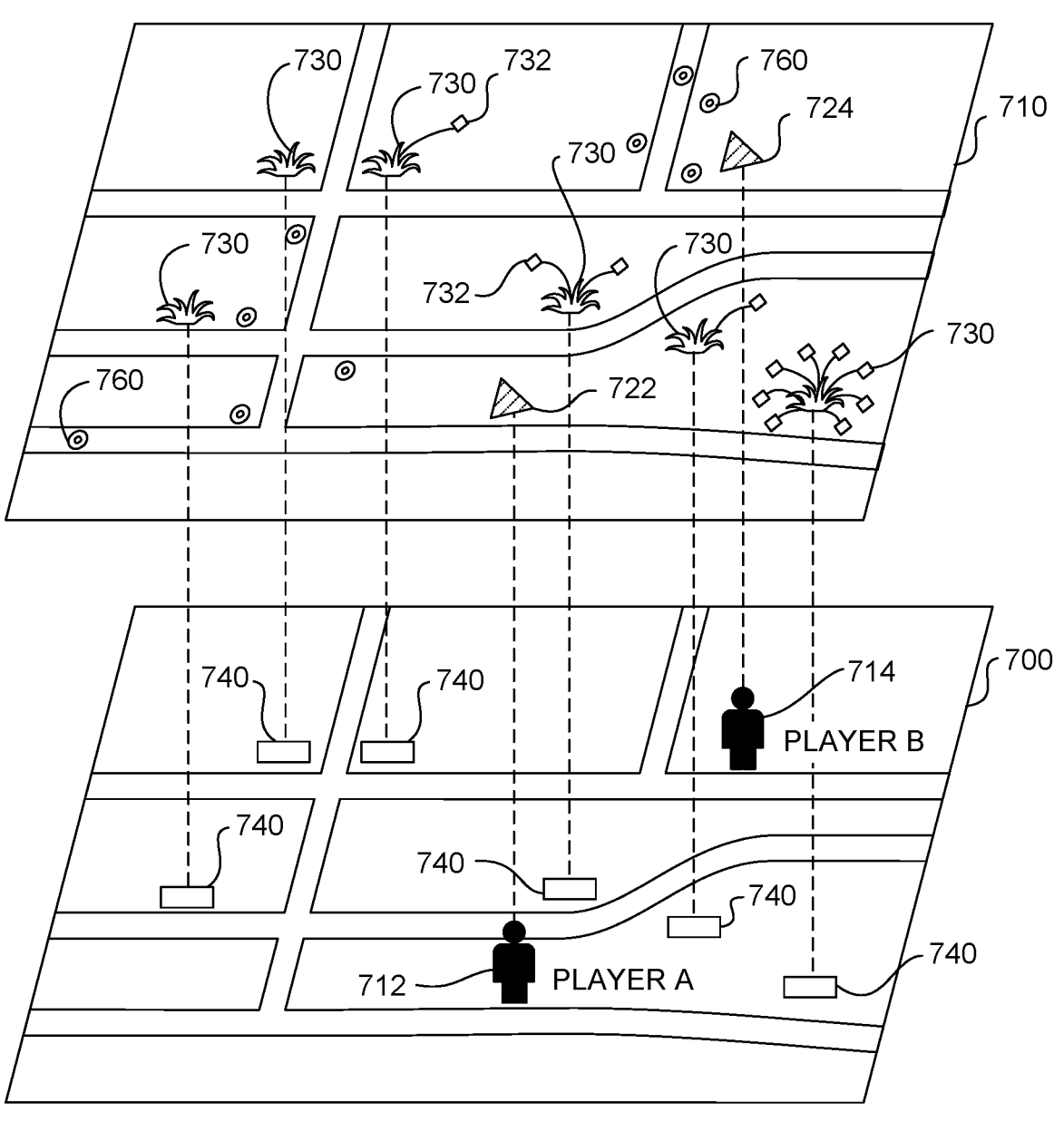
FIG. 7 depicts a representation of a virtual world having a geography that parallels the real world, according to one embodiment.

FIG. 7 depicts a conceptual diagram of a virtual world 710 that parallels the real world 700 that can act as the game board for players of a parallel reality game, according to one embodiment. As illustrated, the virtual world 710 can include a geography that parallels the geography of the real world 700. In particular, a range of coordinates defining a geographic area or space in the real world 700 is mapped to a corresponding range of coordinates defining a virtual space in the virtual world 710. The range of coordinates in the real world 700 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 710 corresponds to the player's position in the real world 700. For instance, the player A located at position 712 in the real world 700 has a corresponding position 722 in the virtual world 710. Similarly, the player B located at position 714 in the real world has a corresponding position 724 in the virtual world. As the players move about in a range of geographic coordinates in the real world, the players also move about in the range of coordinates defining the virtual space in the virtual world 710. In particular, a positioning system (e.g., a GPS system) associated with a mobile computing device carried by the player can be used to track a player's position as the player navigates the range of geographic coordinates in the real world. Data associated with the player's position in the real world 700 is used to update the player's position in the corresponding range of coordinates defining the virtual space in the virtual world 710. In this manner, players can navigate along a continuous track in the range of coordinates defining the virtual space in the virtual world 710 by simply traveling among the corresponding range of geographic coordinates in the real world 700 without having to check in or periodically update location information at specific discrete locations in the real world 700.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 730 located at various virtual locations in the virtual world 710. These virtual elements 730 can be linked to landmarks, geographic locations, or objects 740 in the real world 700. The real-world landmarks or objects 740 can be works of art, monuments, buildings, businesses, libraries, museums, or other suitable real-world landmarks or objects. Interactions include capturing, claiming ownership of, using some virtual item, spending some virtual currency, etc. To capture these virtual elements 730, a player must travel to the landmark or geographic location 740 linked to the virtual elements 730 in the real world and must perform any necessary interactions with the virtual elements 730 in the virtual world 710. For example, player A may have to travel to a landmark 740 in the real world 700 in order to interact with or capture a virtual element 730 linked with that particular landmark 740. The interaction with the virtual element 730 can require action in the real world, such as taking a photograph or verifying, obtaining, or capturing other information about the landmark or object 740 associated with the virtual element 730.

Game objectives may require that players use one or more virtual items that are collected by the players in the location-based game. For instance, the players may travel the virtual world 710 seeking virtual items (e.g., weapons, creatures, power ups, or other items) that can be useful for completing game objectives. These virtual items can be found or collected by traveling to different locations in the real world 700 or by completing various actions in either the virtual world 710 or the real world 700. In the example shown in FIG. 7, a player uses virtual items 732 to capture one or more virtual elements 730. In particular, a player can deploy virtual items 732 at locations in the virtual world 710 proximate or within the virtual elements 730. Deploying one or more virtual items 732 in this manner can result in the capture of the virtual element 730 for the particular player or for the team/faction of the particular player.

In one particular implementation, a player may have to gather virtual energy as part of the parallel reality game. As depicted in FIG. 7, virtual energy 760 can be scattered at different locations in the virtual world 710. A player can collect the virtual energy 760 by traveling to the corresponding location of the virtual energy 760 in the actual world 700. The virtual energy 760 can be used to power virtual items or to perform various game objectives in the game. A player that loses all virtual energy 760 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game platform seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Example Method

Figure 8:
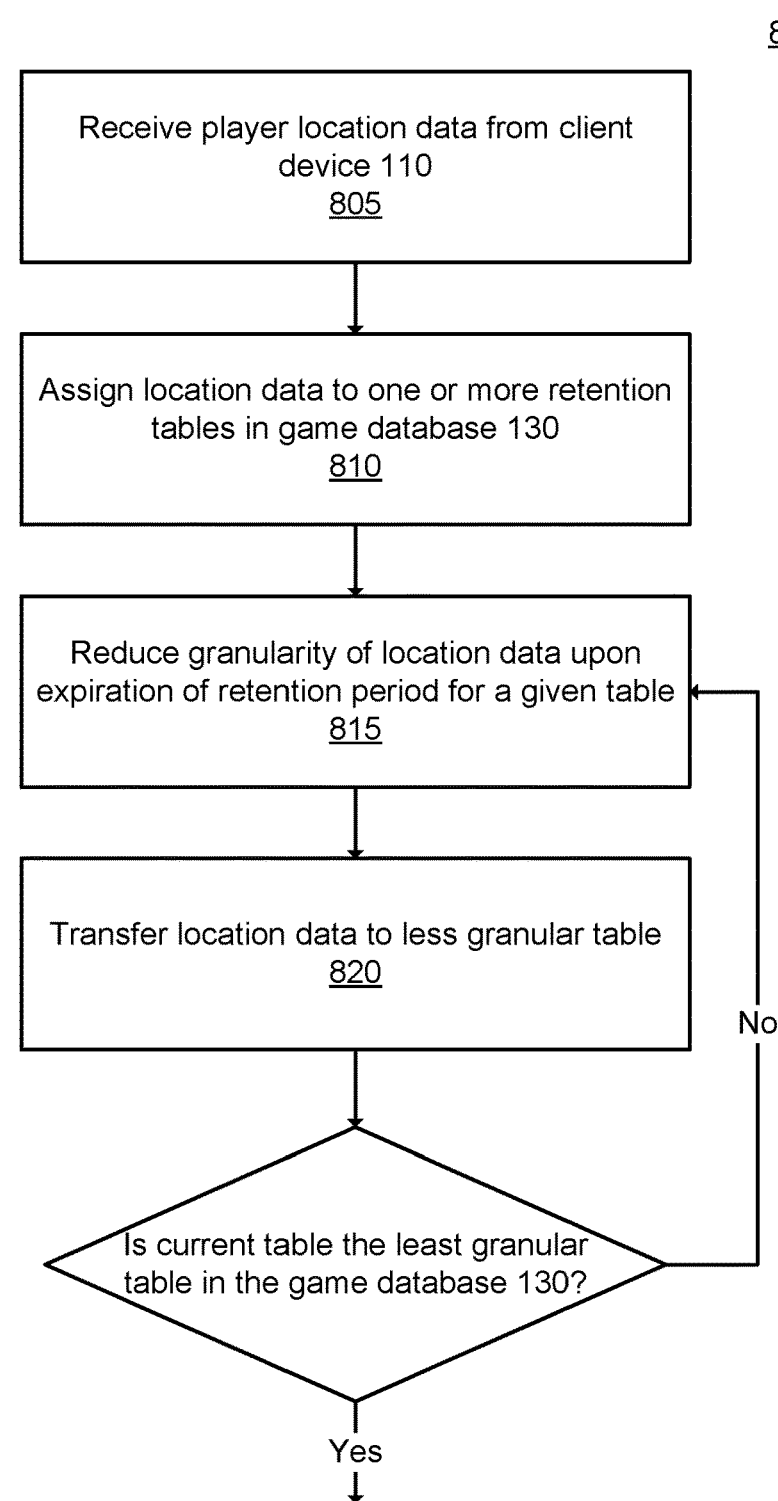
FIG. 8 is a flow chart illustrating a method for anonymizing stored player location data, according to one embodiment.

FIG. 8 is a flow chart illustrating a method 800 for anonymizing stored player location data, according to one embodiment. In some embodiments, the method 800 is performed by one or more servers of the game platform 120, although some or all of the operations in the method 800 may be performed by other entities in other embodiments. In some embodiments, the operations in the method 800 are performed in a different order and can include different or additional steps.

In the embodiment shown, the method 800 begins with the location storage module 350 of the game platform 120 receiving 805 player location data from the positioning module 220 of the client device 110. The player location data may be represented by the location of the player's client device 110 in the real world, according to a satellite navigation positioning system, or one or more other suitable techniques for determining position, as discussed above with respect to FIG. 2. In one embodiment, the location storage module 350 hashes the player ID associated with the received location data.

The location storage module 350 assigns 810 the received location data to one or more retention tables stored in the game database 130 included on or in communication with the game platform 120. Each retention table stores player location data at a different level of granularity and for a different retention period. In one embodiment, the location storage module 350 writes location information derived from the location data to each retention table, such that the player's location is stored at different levels of granularity in the game database 130. For example, the player's location might be stored in a first table containing fine-grained location data (e.g., indicating the player's latitude and longitude), in a second table containing coarser-grained location data (e.g., indicating the city block on which the player is located), and in a third table containing still coarser-grained location data (e.g., indicating the city in which the player is located). In one embodiment, the level of granularity for a table may be represented by a S2 cell level or other geographic indexing level that includes a geographic range in which the client device 110 may be positioned.

Upon determining that the retention period associated with a specific retention table has expired, the location storage module 350 reduces 815 the granularity of the location data store in that table and transfers 820 the location data to a less granular table. In one embodiment, location data stored at in a fine-grained retention table having a first S2 cell level may be abstracted to a second S2 cell level for transfer to a different retention table associated with the latter S2 cell level. For example, the player's latitude and longitude may be abstracted to the city block on which the player is located or the city in which the player is located.

In one embodiment, steps 815 and 820 are iterative. That is, the location storage module 350 performs this abstraction and transfer process for each location data item stored in the plurality of retention tables in the game database 130 based on the retention period of each retention table. In this way, player location data becomes increasingly coarse as the duration since the client device 110 reported the location data increases. If, upon expiration of a retention period, the location storage module 350 determines that the associated retention table is the least granular table in the game database 130, the location storage module 350 deleted 825 the location data item(s) for which the retention period has expired from the game database 130. If the current table is not the least granular table, the location storage module 350 repeats the steps 815 and 820 until the retention period for the least granular table expires.

Example Computing System

Figure 9:
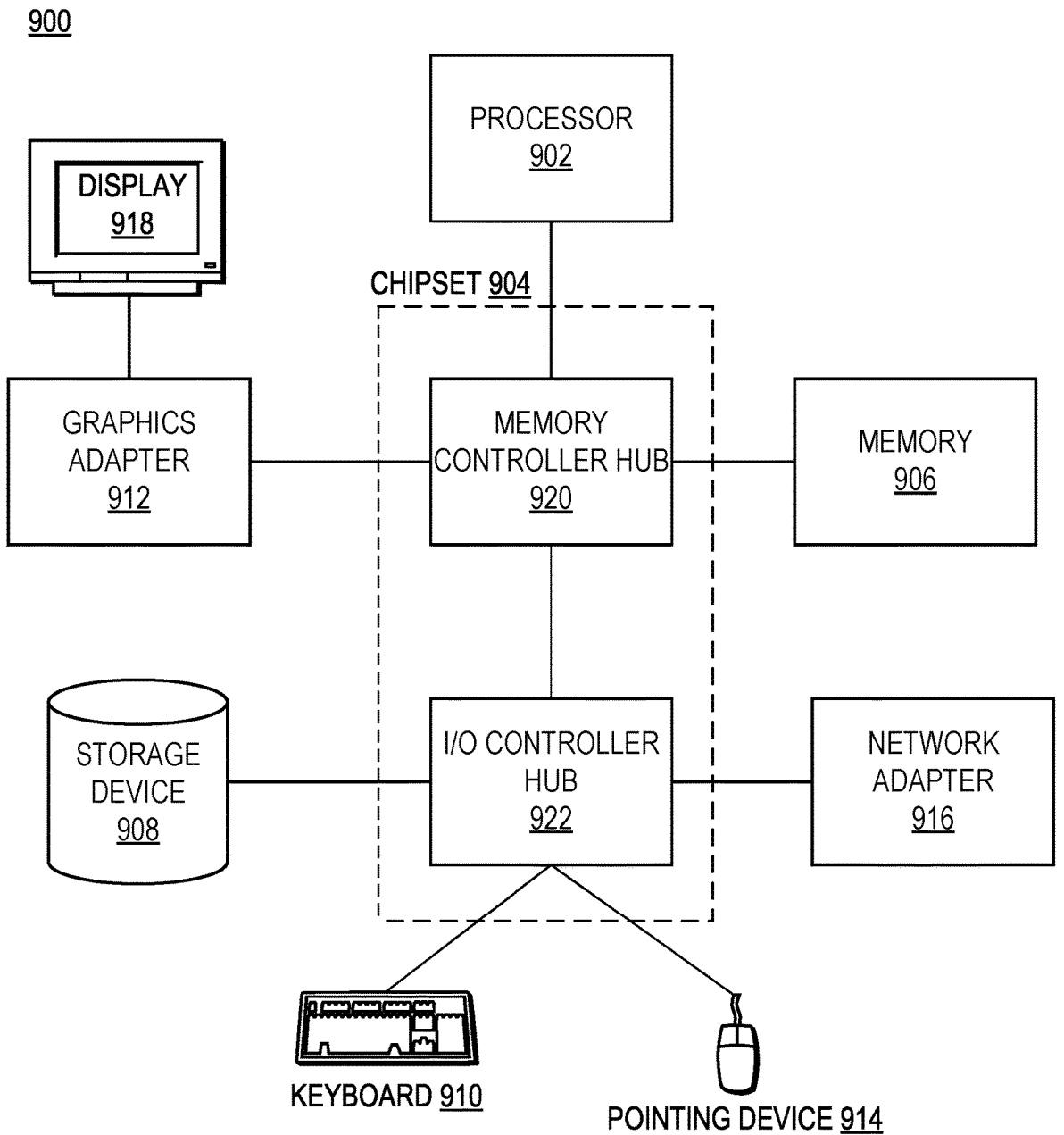
FIG. 9 is a high-level block diagram illustrating a functional view of a typical computer system for use as the game platform of FIG. 1, according to an embodiment.

FIG. 9 is a block diagram illustrating a functional view of a typical computer system 900 for use as a client device 110 or a server of the game platform 120 of FIG. 1, according to an embodiment. Although FIG. 9 depicts illustrates various physical components of a computer used as part or all of one or more entities described herein, a computer may have additional, fewer, or variations of the components shown in FIG. 9. As recognized by those of ordinary skill in the art, items shown separately could be combined and some items could be separated into multiple parts.

Illustrated in FIG. 9 are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O hub 922. In another embodiment, the memory 906 is coupled directly to the processor 902 instead of the chipset 904. In some embodiments, the computer 900 includes one or more communication buses for interconnecting these components. The one or more communication buses optionally include circuitry (sometimes called a chipset) that interconnects and controls communications between system components.

The storage device 908 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 908 can also be referred to as persistent memory. The pointing device 914 may be a mouse, track ball, or other type of pointing device, and is used in combination with the keyboard 910 to input data into the computer 900. The graphics adapter 912 displays images and other information on the display 918. The network adapter 916 couples the computer 900 to a local or wide area network.

The memory 906 holds instructions and data used by the processor 902. The memory 906 can be non-persistent memory, examples of which include high-speed random access memory, such as DRAM, SRAM, DDR RAM, ROM, EEPROM, flash memory.

As is known in the art, a computer 900 can have different or other components than those shown in FIG. 9. In addition, the computer 900 can lack certain illustrated components. In one embodiment, a computer 900 acting as a server may lack a keyboard 910, pointing device 914, graphics adapter 912, or display 918. Moreover, the storage device 908 can be local or remote from the computer 900 (such as embodied within a storage area network (SAN)).

As is known in the art, the computer 900 is adapted to execute computer program modules for providing function-ality described herein. As used herein, the term "module" refers to computer program logic utilized to provide the specified functionality. Thus, a module can be implemented in hardware, firmware, or software. In one embodiment, program modules are stored on the storage device 908, loaded into the memory 906, and executed by the processor 902.

ADDITIONAL CONSIDERATIONS

Some portions of above description describe the embodi-ments in terms of algorithmic processes or operations. These algorithmic descriptions and representations are commonly used by those skilled in the data processing and computer vision arts to convey the substance of their work effectively to others skilled in the art. These operations, while described functionally, computationally, or logically, are understood to be implemented by computer programs comprising instruc-tions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, struc-ture, or characteristic described in connection with the embodiment is included in at least one embodiment. The appearances of the phrase "in one embodiment" in various places in the specification are not necessarily all referring to the same embodiment.

Some embodiments may be described using the expres-sion "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodi-ments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other varia-tion thereof, are intended to cover a non-exclusive inclusion. For example, a process, method, article, or apparatus that comprises a list of elements is not necessarily limited to only those elements but may include other elements not expressly listed or inherent to such process, method, article, or appa-ratus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and func-tional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method for anonymizing user location data, the method comprising:

receiving location data from a client device associated with a user of a location-based application;

hashing a player identification (ID) associated with the user;

writing location information, derived from the location data, and the hashed player ID to a first retention table, the first retention table being a short-term retention table storing the location data for a first geographic area of a first size and for a first retention period, the first retention table storing location data indicating a longitude and latitude of the client device;

responsive to determining that the first retention period has expired, anonymizing the location data and transferring the anonymized location data to a second retention table, the second retention table being a medium-term retention table storing location data for a second geographic area that is larger than the first geographic area and that incorporates the first geographic area, the second retention table storing location data indicating a city block on which the client device is located, wherein the second retention table has a second retention period;

deleting the location data from the first retention table;

responsive to determining that the second retention period has expired, anonymizing the location data and transferring the anonymized location data to a third retention table, the third retention table being a long-term retention table storing location data for a third geographic area that is larger than the second geographic area and that incorporates the second geographic area, the third retention table storing location data indicating a city in which the client device is located, wherein the third retention table has a third retention period;

deleting the location data from the second retention table; and responsive to determining that the retention period for the third retention table has expired, causing the location data to be deleted from storage.

2. The computer-implemented method of claim 1, wherein each retention table stores location data at a cell level associated with a S2 library framework, the first retention table storing location data for a first S2 cell at a first S2 level and the second retention table storing location data for a second S2 cell at a second S2 level, the second S2 cell consisting of the first S2 cell and a plurality of other S2 cells at the first level.

3. The computer-implemented method of claim 1, wherein a retention period for a retention table is inversely proportional to a level of granularity of the table.

4. The computer-implemented method of claim 1, wherein the location-based application is a parallel reality game.

5. The computer-implemented method of claim 1, further comprising:

writing the hashed player ID to a one-way lookup table that maps hashed player IDs of users of the location-based application to raw player IDs;

receiving a request from a first service to identify one or more hashed player IDs, the request including an identification of a second service;

querying the one-way lookup table to identify a raw player ID associated with each of the one or more hashed player IDs; and sending the identified raw player IDs to the second service.

6. The computer-implemented method of claim 5, wherein the first service generates a list of the one or more hashed player IDs for identification using location data from one or more of the retention tables.

7. The computer-implemented method of claim 5, wherein the second service implements a change to the location-based application for the users associated with the raw player IDs.

8. A non-transitory computer-readable storage medium comprising instructions executable by a processor, the instructions executable to perform operations comprising:

receiving location data from a client device associated with a user of a location-based application;

hashing a player identification (ID) associated with the user;

writing location information, derived from the location data, and the hashed player ID to a first retention table, the first retention table being a short-term retention table storing the location data for a first geographic area of a first size and for a first retention period, the first retention table storing location data indicating a longitude and latitude of the client device;

responsive to determining that the first retention period has expired, anonymizing the location data and transferring the anonymized location data to a second retention table, the second retention table being a medium-term retention table storing location data for a second geographic area that is larger than the first geographic area and that incorporates the first geographic area, the second retention table storing location data indicating a city block on which the client device is located, wherein the second retention table has a second retention period;

deleting the location data from the first retention table;

responsive to determining that the second retention period has expired, anonymizing the location data and transferring the anonymized location data to a third retention table, the third retention table being a long-term retention table storing location data for a third geographic area that is larger than the second geographic area and that incorporates the second geographic area, the third retention table storing location data indicating a city in which the client device is located, wherein the third retention table has a third retention period;

deleting the location data from the second retention table; and responsive to determining that the retention period for the third retention table has expired, causing the location data to be deleted from storage.

9. The non-transitory computer-readable storage medium of claim 8, wherein each retention table stores location data at a cell level associated with a S2 library framework, the first retention table storing location data for a first S2 cell at a first S2 level and the second retention table storing location data for a second S2 cell at a second S2 level, the second S2 cell consisting of the first S2 cell and a plurality of other S2 cells at the first level.

10. The non-transitory computer-readable storage medium of claim 8, wherein the location-based application is a parallel reality game.

11. The non-transitory computer-readable storage medium of claim 8, wherein the operations further comprise:

writing the hashed player ID to a one-way lookup table that maps hashed player IDs of users of the location-based application to raw player IDs;

receiving a request from a first service to identify one or more hashed player IDs, the request including an identification of a second service;

querying the one-way lookup table to identify a raw player ID associated with each of the one or more hashed player IDs; and sending the identified raw player IDs to a second service.

12. The non-transitory computer-readable storage medium of claim 11, wherein the first service generates a list of the one or more hashed player IDs for identification using location data from one or more of the retention tables.

13. The non-transitory computer-readable storage medium of claim 12, wherein the second service implements a change to the location-based application for the users associated with the raw player IDs.

* * * * *